US006975881B2

(12) United States Patent
Sheynman et al.

(10) Patent No.: US 6,975,881 B2
(45) Date of Patent: Dec. 13, 2005

(54) COMMUNICATION CONTROLLER AND METHOD FOR MAINTAINING A COMMUNICATION CONNECTION DURING A CELL RESELECTION

(75) Inventors: Arnold Sheynman, Northbrook, IL (US); Greg R. Black, Vernon Hills, IL (US); Mark E. Pecen, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 50 days.

(21) Appl. No.: 10/647,355

(22) Filed: Aug. 25, 2003

(65) Prior Publication Data

US 2005/0049000 A1    Mar. 3, 2005

(51) Int. Cl.[7] .............................. H04Q 7/20; H04Q 7/38
(52) U.S. Cl. .................... 455/552.1; 455/436; 455/437; 455/440; 455/442; 455/426.1; 455/422.1; 455/553.1; 370/331; 370/332; 370/334; 370/351; 370/352; 370/355; 370/357
(58) Field of Search ........................ 455/403, 436–444, 455/422.1, 414.1, 414.2, 414.4, 432.1, 432.2, 455/434, 550.1, 552.1, 556.1, 556.2, 553.1, 455/426.1, 426.2, 445, 524; 370/331, 332, 370/334, 351, 352, 355, 357, 480, 493, 494, 370/495

(56) References Cited

U.S. PATENT DOCUMENTS

| | | | |
|---|---|---|---|
| 6,157,845 A | 12/2000 | Henry et al. | |
| 6,590,880 B1 | 7/2003 | Maenpaa et al. | |
| 6,603,972 B1 | 8/2003 | Sawyer | |
| 6,647,262 B1 * | 11/2003 | Demetrescu et al. ........ | 455/436 |
| 6,751,472 B1 * | 6/2004 | Muhonen ................. | 455/553.1 |
| 2002/0118662 A1 | 8/2002 | Sheynman et al. | |
| 2002/0137522 A1 * | 9/2002 | Landais et al. ............. | 455/455 |
| 2003/0092445 A1 | 5/2003 | Timonen et al. | |
| 2004/0196826 A1 * | 10/2004 | Bao et al. .................... | 370/352 |
| 2004/0203707 A1 * | 10/2004 | Akhteruzzaman et al. ....................... | 455/422.1 |
| 2004/0219921 A1 * | 11/2004 | Cao et al. .................... | 455/444 |

FOREIGN PATENT DOCUMENTS

WO         WO 01/76162 A1      10/2001

OTHER PUBLICATIONS

GSM 3GPP TS 29.061 V3.10.0 (Jun. 2002) Technical Specification; 3rd Generation Partnership Project; Technical Specification Group Core Network; Packet Domain; Interworking between the Public Land Mobile Network (PLMN) supporting Packet Based Services and Packet Data Networks (PDN) (Release 1999).

* cited by examiner

*Primary Examiner*—Keith Ferguson
(74) *Attorney, Agent, or Firm*—Lawrence J. Chapa

(57) ABSTRACT

The present invention provides a communication controller and a method for maintaining a communication connection during a cell reselection. The communication connection is maintained by changing between a first operating mode, such as a packet data mode, which does not support the maintenance of a communication connection throughout a cell reselection, and a second operating mode, such as a circuit switched mode, which does support maintenance of a communication connection during a handover. Use of a virtual mobile switching center in the base station subsystem facilitates the conversion and routing of circuit switched data, transmitted between the mobile subscriber and the base transceiver station, to the packet data network while in a circuit switched mode.

34 Claims, 5 Drawing Sheets

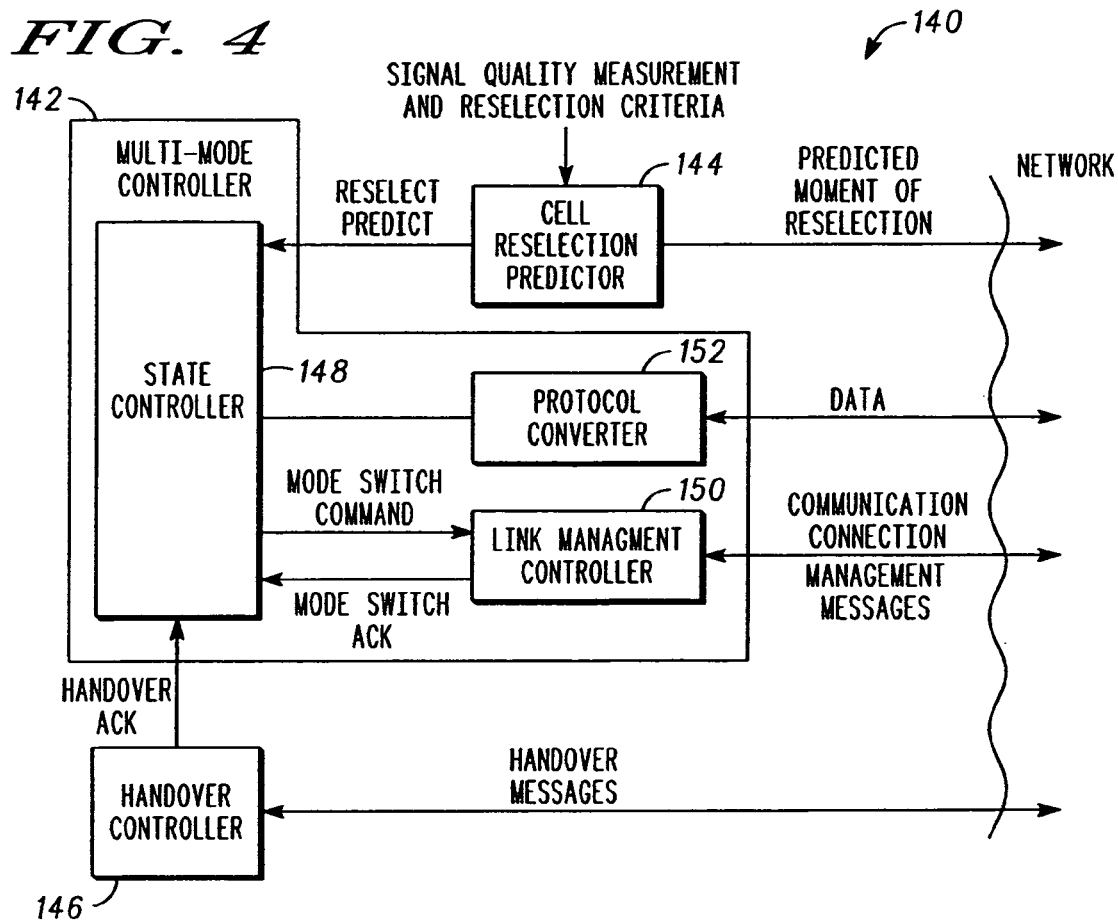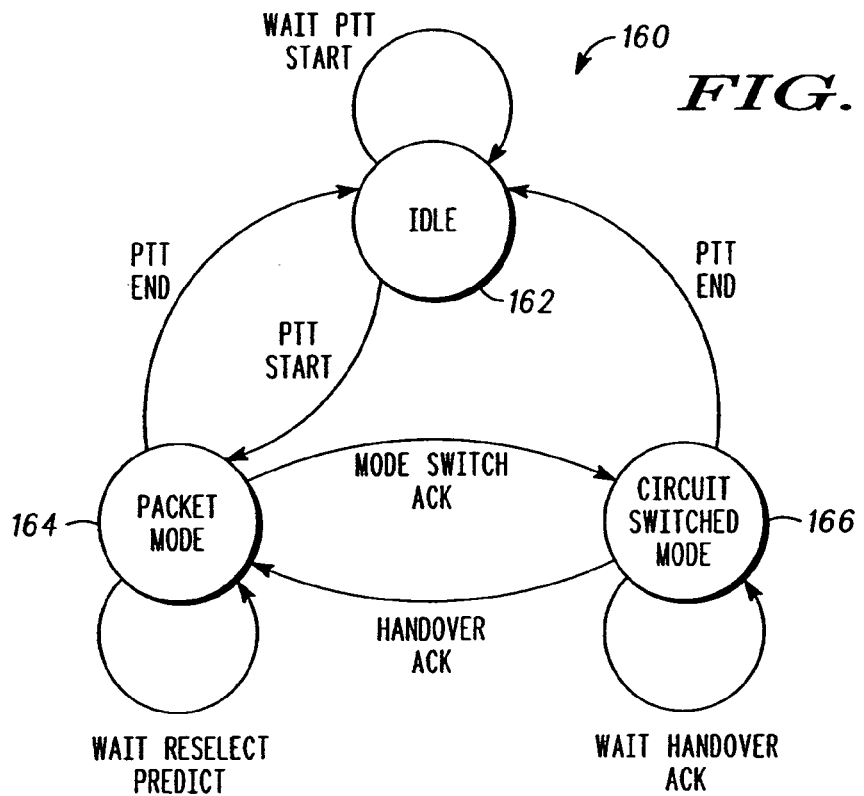

COMMUNICATION CONTROLLER AND METHOD FOR MAINTAINING A COMMUNICATION CONNECTION DURING A CELL RESELECTION

FIELD OF THE INVENTION

The present invention relates generally to controlling the communication connections between a mobile subscriber and one or more cells as the mobile experiences communication conditions consistent with a cell reselection, and more particularly, to switching between modes to facilitate a handover which maintains a communication connection during a reselection.

BACKGROUND OF THE INVENTION

Mobile subscribers use wireless communication devices to communicate over a cellular wireless communication network by transmitting and receiving wireless signals between the wireless communication devices and one or more base stations. The one or more base stations are generally spread throughout an area of coverage, which are often divided into one or more smaller areas called cells.

As mobile subscribers move from one cell to another cell, it often becomes necessary to communicate with the network via different base stations. The need to transition from one base station to another base station often coincides with the mobile subscriber moving further away from and/or out of transmission range with a first base station and closer to and/or within transmission range with a second base station.

If the mobile subscriber is communicating with the network, when it becomes necessary to switch from one base station to another, different types of networks handle the transition in different ways. Sometimes, the manner in which the transition is handled is dependent upon the particular operating mode and/or the type of communication protocol being used. In many instances, the manner in which the transition is handled is a by-product of the originally intended services, which were to be supported by a particular network, operating mode and/or protocol. However increasingly, networks, operating modes and/or protocols are being expected to support types of communication, that they were never originally intended to support.

One such example includes voice communications over a packet network. Packet data networks were historically principally intended to transmit text or data files, where reliability was more important than small transmission delays. Alternatively with voice communications, small data losses are generally more tolerable than small transmission delays. As a result, when many packet data networks were developed, and corresponding network infrastructure later deployed, events which produced delays in transmission were allowed to occur, while a greater focus was placed on minimizing data losses.

An example of an event, which in at least some data packet networks, results in some transmission interruption associated with a delay, includes the handling of a transition from one base station to another, for facilitating further communication with the network. In at least one packet data network, such as general packet radio services (GPRS), a mobile subscriber will attempt to establish communication with a second base station only after communication with the first base station is lost. This can result in a delay of continued communications, which is often greater than several seconds. During real time voice type communications, a delay of this magnitude is largely viewed as intolerable. This presents special challenges for data services, which attempt to communicate real time voice data via a packet data network, such as push to talk, which provides walkie talkie-type simplex communication, and voice over IP (internet protocol), which attempts to provide more traditional type duplex voice communications over the packet data network.

As a result, it would be beneficial to develop techniques, which minimize the transmission delays, including any delays associated with transitioning between a first base station and a second base station. Still further, it would be beneficial to develop techniques, which minimize transmission delays, in a manner which can be implemented with minimal impact on existing infrastructure.

SUMMARY OF THE INVENTION

The present invention provides a method for maintaining a communication connection during a cell reselection. The method includes communicating in a first operating mode, and monitoring communication conditions, while operating in the first operating mode. An approximate time, when the communication conditions are consistent with executing a reselection from a first cell to a second cell, is then determined. The method further includes switching from a first mode of communication to a second mode of communication prior to the determined approximate time for reselection, and executing a handover from a first cell to a second cell, while in the second operating mode.

In at least one embodiment, the method additionally includes switching from the second operating mode to the first operating mode after handover is completed.

The present invention further provides a communication controller. The communication controller includes a multi-mode controller, a cell reselection predictor coupled to the multi-mode controller, and a handover controller coupled to the multi-mode controller. The multi-mode controller is adapted for generating control signals for switching between a first operating mode, which does not maintain a communication connection during a cell reselection, and a second operating mode, which does maintain a communication connection during a handover, prior to the time that the need for a cell reselection is predicted.

The present invention still further provides a base station subsystem for use in a wireless communication system, which is coupled to a first network, which supports a first communication protocol, and a second network, which supports a second communication protocol. The base station subsystem further includes a wireless interface including one or more wireless transceivers, and a protocol converter for at least one of transmitting and receiving information in at least one of the first communication protocol and the second communication protocol, wherein the protocol converter is adapted for selectively converting the format of the transmitted and received information between the first communication protocol and the second communication protocol.

These and other objects, features, and advantages of this invention are evident from the following description of one or more preferred embodiments of this invention, with reference to the accompanying drawings.

BRIEF DESCRIPTION OF THE DRAWINGS

FIG. 4 is a more detailed block diagram of a communication controller;

FIG. 5 is a state diagram defining multiple states and the conditions under which the current state changes between the multiple states, consistent with maintaining a communication connection during a cell reselection, in accordance with at least one embodiment of the present invention;

DETAILED DESCRIPTION OF THE PREFERRED EMBODIMENT(S)

Figure 1:
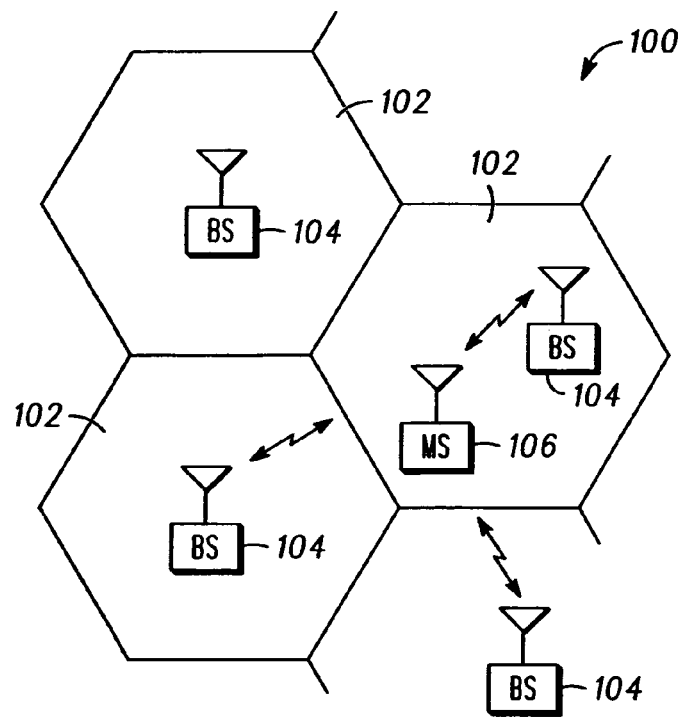
FIG. 1 is an exemplary topographical view of a geographical region representing a portion of the coverage area for a wireless communication system.
Figure 3:
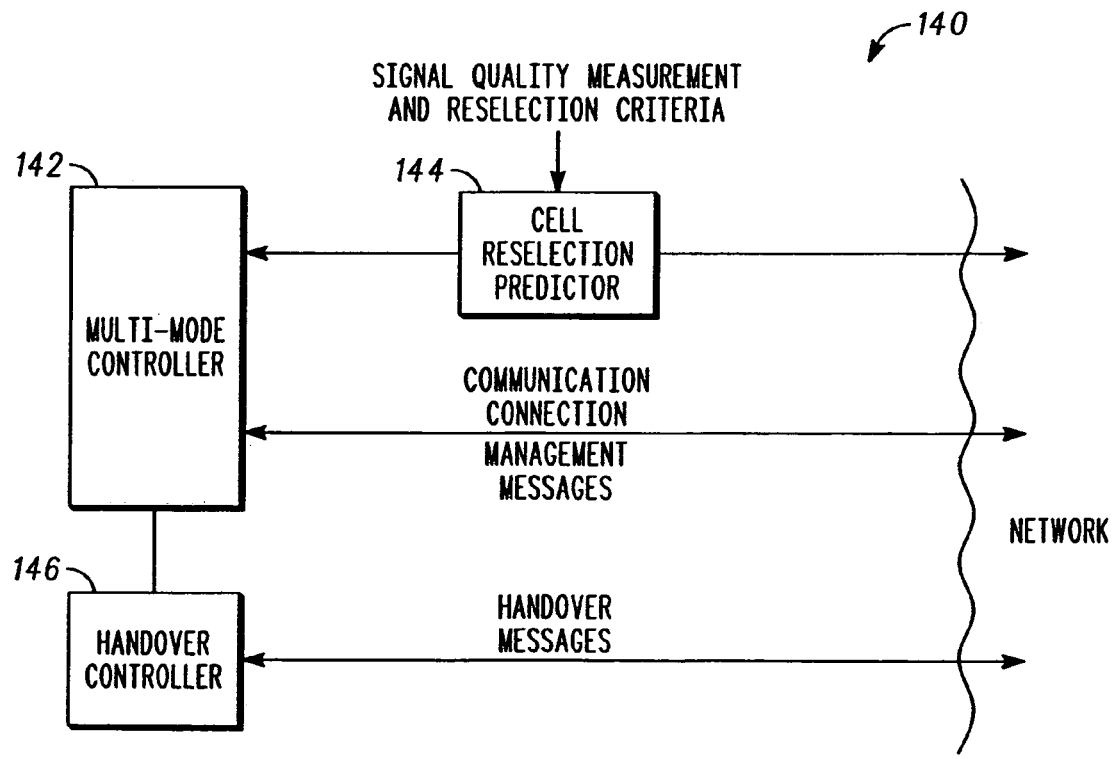
FIG. 3 is a block diagram of a communication controller, in accordance with at least one embodiment of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary topographical view of portions of a wireless communication system. The topographical view 100 includes a plurality of cells 102 pictorially represented as hexagons. The hexagons are only rough approximations, where in reality the area of transmission for each of the cells 102 is not so uniformly defined. Each cell 102 is typically served by one or more base stations (BS) 104, referred to as a serving station, which communicates with mobile stations (MS) 106 traveling within the corresponding cell 102.

Generally, the further a mobile station 106 moves away from the serving base station 104 the weaker the signal gets. Conversely, as a mobile station 106 moves toward a base station 104 the signal typically becomes stronger. As a mobile station 106 continues to move away from a serving base station 104 and towards a base station 104 of a neighboring cell 102, at some point it will become desirable to transfer control of the continued communication to the base station 104 of the neighboring cell 102. The decision to transfer control is typically determined based upon the relative strength of the signal received from the serving base station and the base stations of each of the nearby cells 102. Consequently, wireless communication devices operating in association with several over the air operating standards monitor the relative strength of signals from both the serving cell and the one or more nearby neighboring cells.

If the mobile station 106 is engaged in a packet data communication, such as general packet radio services (GPRS) type data connection, when control is to be transferred from the serving base station to a base station of one of the neighboring cells, initiation of a connection to the previously neighboring base station is attempted, only after the connection with the previously serving base station is dropped and/or terminated. This is commonly referred to as a reselection. Alternatively, circuit switched type connections allow for a handover of an active communication connection with the network. The requirement for a reselection can result in a delay of several seconds before a communication connection facilitating the flow of data can be reestablished. If the packet data network is being used to convey real time voice type communications, a delay of several seconds can be unsatisfactory. Examples of where real time voice type communications over a packet network would be beneficial include implementations of voice over IP and push to talk. Real time voice type communications over a packet network would be further beneficial if the potential sources of delay could be accommodated and still further beneficial if the potential sources of delay could be accommodated with minimal impact on existing infrastructure.

In accordance with at least one aspect of the present invention, a cell reselection predictor monitors communication conditions and predicts when a cell reselection is likely to occur. The cell reselection prediction is then used to trigger a mode change between a packet data mode and a circuit switched mode. The transfer of control to the new base station is then facilitated through existing handover techniques. In at least some embodiments, after the handover is completed a switch back to the packet data mode is executed.

Figure 2:
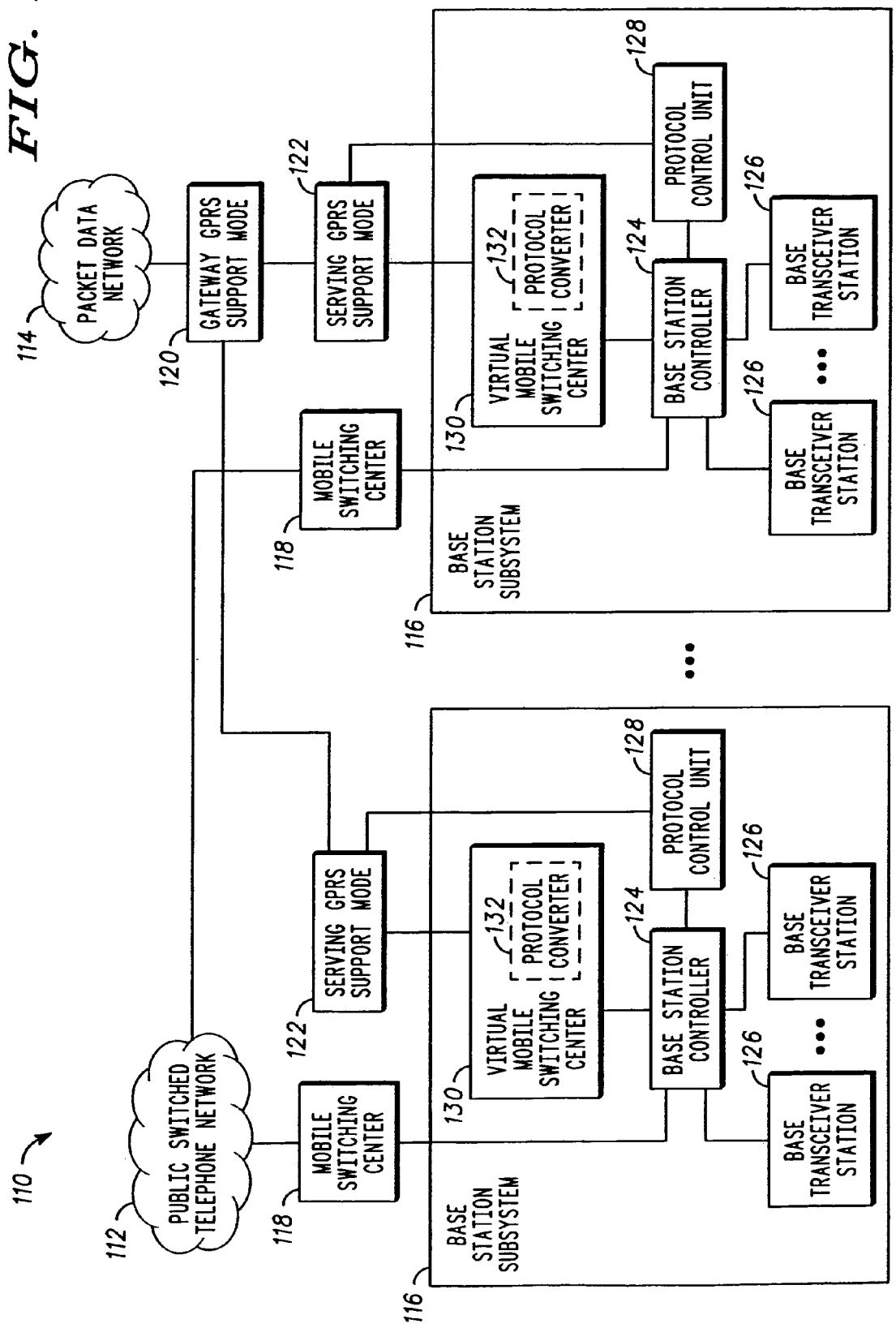
FIG. 2 is a block diagram of a pair of base station subsystems, each in accordance with at least one embodiment of the present invention, and each coupled to a pair of exemplary networks, namely a packet data network and a circuit switched network.

FIG. 2 illustrates a block diagram 110 of a pair of exemplary networks, namely a packet data network and a circuit switched network, and at least a pair of base station subsystems in accordance with at least one embodiment of the present invention. Many of the network elements are consistent with the global system for mobile communications (GSM) standard, and facilitate the communication of data via a wireless communication network to the public switched telephone network 112 and a packet data network 114, such as the Internet. The public switched telephone network is coupled to one or more base station subsystems 116, via one or more mobile switching centers 118. The packet data network is coupled to the base station subsystem via one or more gateway GPRS support nodes 120 and one or more serving GPRS support nodes 122. In some instances multiple base station subsystems 116 will share the same mobile switching centers 118, serving GPRS support nodes 122, and/or gateway GPRS support nodes 120.

A base station controller 124 couples one or more base transceiver stations 126 (i.e. base stations 104), which incorporate one or more transceivers as part of a wireless interface, to the mobile switching center 118 for facilitating the transfer of circuit switched data to the public switched telephone network 112. The base station controller 124 further couples the one or more corresponding base transceiver stations 126 to the serving GPRS support node 122, via a protocol control unit 128 for facilitating the transfer of packet data received from a mobile subscriber 106 to the packet data network 114. Alternatively, the base station controller 124 still further couples the one or more corresponding base transceiver stations 126 to the serving GPRS support node 122, via a corresponding virtual mobile switching center 130. In addition to forwarding data received from a mobile subscriber 106 to the packet data network 114, the virtual mobile switching center 130 includes a protocol converter 132, which is adapted to convert the data format between a circuit switched data format and a packet data format.

The conversion performed by the protocol converter 132 reformats, as necessary, any header data to correspond to the appropriate target header format. Similarly, the payload and/or associated data is reformatted to correspond to the size and signal format of the target protocol. Where the size of the payload is adjusted, it may be appropriate to insert additional data packets, and/or to remove excessive packets, while redistributing the data between the new reformatted data packets. In at least one embodiment the data connection with the circuit switched network is supported by a high speed circuit switched data (HSCSD) connection.

The use of a virtual mobile switching center 130 enables the base station subsystem 116 to behave as if it where coupled to the circuit switched network 112, via the non-virtual mobile switching center 118, while data is translated and forwarded to the packet data network 114. The virtual mobile switching center 130 can be a software application, which is executed by the base station controller 124. The virtual mobile switching center 130 could alternatively be implemented in hardware, or any corresponding combination of hardware and software. However, one of the features of a largely software implementation, is the potential minimal impact on existing infrastructure, wherein the modification may be introduced into the base station subsystem 116 as part of a software upgrade. Still further, existing software routines in the base station controller 124 are similarly minimally impacted.

The base station subsystem 116 is intended to interface with similarly adapted mobile subscribers. The adapted mobile subscribers include a communication controller 140, which serves to generate control signals for switching between a first operating mode, which does not maintain a communication connection during a cell reselection, and a second operating mode, which does maintain a communication connection during a handover, prior to the time that the need for a cell reselection is predicted. The communication controller 140 includes a multimode controller 142, a cell reselection predictor 144, and a handover controller 146.

The cell reselection predictor 144 monitors communication conditions, while operating in a first packet data mode, by receiving signal quality measurements and any other reselection criteria. In at least one embodiment, the signal quality measurements include signal strength measurements. Alternatively, the signal quality measurements can include other signal quality measurements, such as signal to noise ratio, bit error rate, etc. By monitoring the change in the signal quality over time and comparing the corresponding rate of change to a predetermined threshold value, it can be anticipated and/or predicted when a reselection may become necessary. Prior to the predicted point in time that a reselection is anticipated to become necessary, the multi-mode controller 142 will switch between a first operating mode and a second operating mode. As part of switching between a first operating mode and a second operating mode, the multi-mode controller 142 establishes a communication connection and/or link with the base station transceiver station 126 in the second operating mode. Additionally, the format of the data transmitted may be converted between a format compatible with each of the first and second modes.

Once the mobile subscriber is operating in the second mode of operation, a handover can occur when appropriate. Upon completion of the handover the multi-mode controller switches from between the second operating mode to the first operating mode in connection with the new base transceiver station, and as appropriate any protocol conversion may be discontinued.

In at least one embodiment, the multi-mode controller 142 includes a state controller 148, which supervises the changing states of the communication controller of the mobile subscriber, and a link management controller 150, which establishes and maintains communication connections in each of the first and second operating modes. The multi-mode controller 142 further includes a protocol converter 152, which like the protocol converter described in connection with the virtual mobile switching center 130 serves to convert as necessary between data format protocols associated with each of the first operating mode and the second operating mode, or in at least one embodiment between a packet data mode consistent with general packet radio GPRS and a data mode consistent with HSCSD.

By switching to a second mode, which better supports a transfer of control to a new base station, while maintaining a communication connection throughout the transfer (i.e. handover), previously established procedures can be employed for transferring control to a new basestation, while minimizing and/or eliminating any communication disruptions associated with a reselection.

Figure 6:
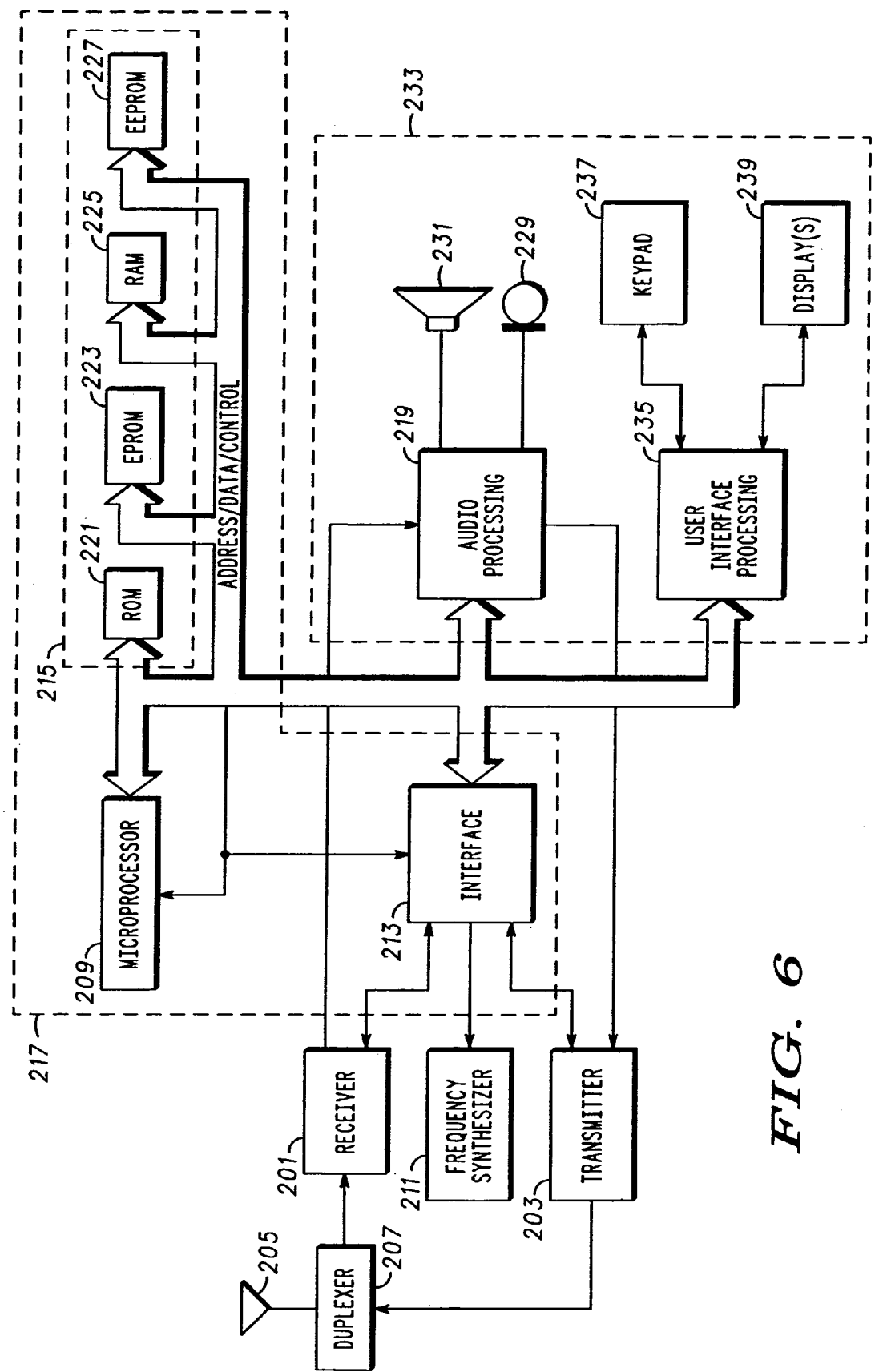
FIG. 6 is a block diagram of least one embodiment of the wireless communication device, which could be used to incorporate the present invention.

In at least one embodiment, the state controller 148 includes a state machine 160 having three defined states, of which one such example is illustrated in FIG. 6. The specific example relative to FIG. 6 illustrates the mode-switch relative to a push to talk (PTT) call, however the same or similar state diagram could be used in conjunction with a voice over IP or any other transmission of any delay insensitive data via an operating mode that does not maintain a communication connection, when a transfer to a new base station occurs.

In the illustrated example, the state machine 160 includes an idle state 162, a packet mode state 164, and a circuit switched mode state 166. Generally, the state machine will remain in an idle state until a PTT call is started. Upon starting a PTT call, the state machine 160 will transition from an idle state 162 to a packet mode state 164. The state machine 160 will remain in the packet mode state 164 until either a reselection is predicted or the PTT call is ended. If the PTT call ends, the state machine 160 returns to the idle state 162. However, if a reselection is predicted, the state machine 160 changes state to the circuit switched mode state 166.

Upon entering the circuit switched mode state 166, the state machine 160 will remain in the circuit switched mode state 166 until the PTT call either ends, or the anticipated handover occurs. If the PTT call ends, the state machine 160 will transition from the circuit switched mode state 166 to the idle state 162. However, if a handover is completed, the state machine 160 will transition back to the packet mode state 164.

It is noted, that the state machine can be implemented in software or hardware. More specifically, the state machine could be formed using hardware elements, such as logic gates and/or elements. Alternatively, the state machine could be implemented using prestored program instructions, and/or could be implemented using a combination of both hardware elements and programming instructions.

FIG. 6 illustrates an exemplary block diagram for at least one embodiment of a wireless communication device 200, which could be used to implement the present invention. The wireless communication device 200 includes a radio receiver 201 and a transmitter 203. Both the receiver 201 and the transmitter 203 are coupled to an antenna 205 of the wireless communication device by way of a duplexer 207. The particular radio frequency to be used by the transmitter 203 and the receiver 201 is determined by the microprocessor 209 and conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213.

In the preferred embodiment, the microprocessor 209 forms part of the processing unit, which in conjunction with the interface circuitry 213 performs the necessary processing functions under the control of program instructions stored in a memory section 215. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Identifying features of the wireless communication device are typically stored in EEPROM 227 (which may also be stored in the microprocessor in an on-board EEPROM, if available) and can include the number assignment (NAM) required for operation in a conventional cellular system.

To the extent that the communication controller including the state machine 160 is implemented in hardware, the logic elements could be located in interface 213 and or make use of memory elements in memory section 215. To the extent that the communication controller is implemented using programming instructions, the programming instruction could be stored in memory section 215 for execution by one or more processors including microprocessor 209.

Control of user audio, the microphone 229 and the speaker 231, is controlled by audio processing circuitry 219, which forms part of a user interface circuit 233. The user interface circuit 233 additionally includes user interface processing circuitry 235, which manages the operation of any keypad(s) 237 and/or display(s) 239. It is further envisioned that any keypad operation could be included as part of a touch sensitive display.

Figure 7:
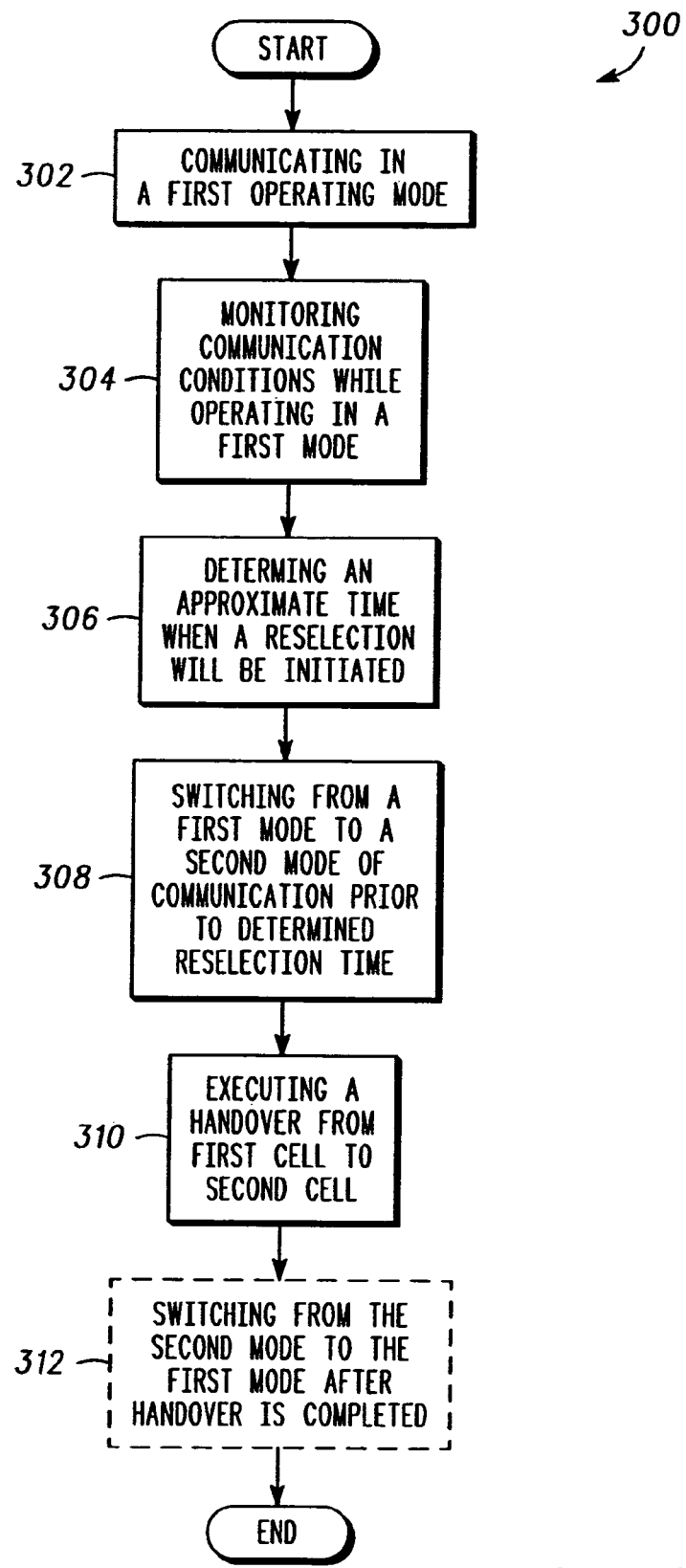
FIG. 7 is a flow diagram of a method for maintaining a communication connection during a cell reselection, in accordance with at least one embodiment of the present invention.

FIG. 7 illustrates a flow diagram 300 of a method for maintaining a communication connection during a cell reselection, in accordance with at least one aspect of the present invention. The method includes communicating in a first operating mode 302. Communication conditions are then monitored 304, while operating in the first mode. An approximate time, when a reselection will be initiated is then determined 306. The method then provides for switching 308 from a first mode to a second mode of communication prior to the determined reselection time. A handover is then executed 310 from the first cell to the second cell.

In at least one embodiment upon completion of the handover, the operational mode of the communication is then switched 312 from a second mode back to a first mode. In this way communication can continue in the first mode, until if or when a further reselection may be desired.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for maintaining a communication connection during a cell reselection, the method comprising:
communicating in a first operating mode;
monitoring communication conditions, while operating in the first operating mode;
determining an approximate time when the communication conditions are consistent with executing a reselection from a first cell to a second cell;
switching from a first mode of communication to a second mode of communication prior to the determined approximate time for reselection; and
executing a handover from a first cell to a second cell, while in the second operating mode.

2. A method in accordance with claim 1 further comprising switching from the second operating mode to the first operating mode after handover is completed.

3. A method in accordance with claim 1 wherein the first operating mode does not maintain a communication connection throughout a cell reselection.

4. A method in accordance with claim 3 wherein the first operating mode attempts to establish a communication connection with a second cell after the communication connection with the first cell is dropped.

5. A method in accordance with claim 1 wherein the first operating mode includes a packet data communication mode.

6. A method in accordance with claim 5 wherein the packet communication mode uses a communication protocol conforming to at least one of a general packet radio service (GPRS) standard and an enhanced data global evolution (EDGE) standard.

7. A method in accordance with claim 5 wherein the at least some of the packets of data communicated in the packet data communication mode include packetized voice data.

8. A method in accordance with claim 7 wherein the voice data is communicated as part of a push to talk (PTT) call session.

9. A method in accordance with claim 7 wherein the voice data is communicated as part of a voice over internet protocol (VoIP) call session.

10. A method in accordance with claim 1 wherein the second operating mode maintains a communication connection throughout the handover.

11. A method in accordance with claim 10 wherein the second mode establishes a communication connection with the second cell prior to terminating the communication connection with the first cell during reselection.

12. A method in accordance with 11 wherein the data flow associated with a communication is routed via the communication connection with the second cell prior to terminating the communication connection with the first cell during reselection.

13. A method in accordance with claim 1 wherein the second operating mode includes a circuit switched connection.

14. A method in accordance with claim 13 wherein the circuit switched connection is a high speed circuit switched data (HSCSD) connection.

15. A method in accordance with claim 1 wherein monitoring communication conditions includes measuring the quality of signals received from a serving cell including the first cell, and measuring the quality of the signals received from one or more neighboring cells including the second cell.

16. A method in accordance with claim 15 wherein determining a time when conditions are consistent with executing a handover includes comparing at least some of the signal quality measurements of the signals received from the serving cell with at least one of a predetermined threshold and one or more of the signal quality measurements of the signals received from the one or more neighboring cells.

17. A method in accordance with claim 15 wherein at least some of the signal quality measurements includes a received signal strength indicator (RSSI).

18. A communication controller comprising:
a multi-mode controller;
a cell reselection predictor coupled to the multi-mode controller; and
a handover controller coupled to the multi-mode controller;
wherein the multi-mode controller is adapted for generating control signals for switching between a first operating mode, which does not maintain a communication connection during a cell reselection, and a second operating mode, which does maintain a communication connection during a handover, prior to a time that the need for a cell reselection is predicted.

19. A communication controller in accordance with claim 18 wherein the multi-mode controller is further adapted for generating control signals for switching from the second operating mode to the first operating mode after handover is completed.

20. A communication controller in accordance with claim 18 wherein the cell reselection predictor has an input for receiving one or more of signal quality measurements and reselection criteria for one or more signals received from at least one of a serving cell and one or more neighboring cells.

21. A communication controller in accordance with claim 18 wherein the multimode controller includes a state controller including at least one of logic circuitry and prestored programming instruction for implementing a state machine, and a link management controller, which is adapted for managing a communication link in each of multiple operating modes.

22. A communication controller in accordance with claim 21 wherein the state machine of the multimode controller includes:
an idle state, corresponding to no active communication;
a packet mode state, corresponding to an active communication state when no reselection is at least one of occurring and pending; and
a circuit switched mode state, corresponding to an active communication state while a reselection is at least one of occurring and pending.

23. A communication controller in accordance with claim 22 wherein the current state of the state machine is adapted to change to the packet mode state upon initiation of a communication connection.

24. A communication controller in accordance with claim 22 wherein the current state of the state machine is adapted to change to the idle state upon termination of a communication connection.

25. A communication controller in accordance with claim 22 wherein the current state of the state machine is adapted to change to the circuit switched mode state prior to initiation of a cell reselection.

26. A communication controller in accordance with claim 22 wherein the current state of the state machine is adapted to change to the packet mode state upon completion of a handover.

27. A communication controller in accordance with claim 18 wherein the handover controller is adapted for producing control signals for managing a handover, after a connection is established in the second operating mode.

28. A communication controller in accordance with claim 18 wherein the first operating mode is a packet data communication mode.

29. A communication controller in accordance with claim 18 wherein the second operating mode is a circuit switched communication mode.

30. A communication controller in accordance with claim 18 wherein the communication connection includes voice data communicated as part of a push to talk (PTT) call session.

31. A communication controller in accordance with claim 18 wherein the communication connection includes voice data communicated as part of a voice over internet protocol (VoIP) call session.

32. A communication controller in accordance with claim 18 wherein the multimode controller further includes a protocol converter, which is adapted for selectively converting the format of the information to be transmitted and information received between a format supporting the first operating mode and a format supporting the second operating mode.

33. A communication controller in accordance with claim 18 incorporated as part of a mobile communication device.

34. A communication controller in accordance with claim 33 wherein the mobile communication device is a cellular telephone.

* * * * *